United States Patent
Yun et al.

(10) Patent No.: US 7,409,528 B2
(45) Date of Patent: Aug. 5, 2008

(54) DIGITAL SIGNAL PROCESSING ARCHITECTURE WITH A WIDE MEMORY BANDWIDTH AND A MEMORY MAPPING METHOD THEREOF

(75) Inventors: Hyun-kyu Yun, Seongnam-si (KR); Han-tak Kwak, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 117 days.

(21) Appl. No.: 10/808,341

(22) Filed: Mar. 25, 2004

(65) Prior Publication Data

US 2005/0083338 A1 Apr. 21, 2005

(30) Foreign Application Priority Data

Aug. 25, 2003 (KR) ............ 10-2003-0058781

(51) Int. Cl.
*G06T 1/20* (2006.01)
(52) U.S. Cl. ............ 712/14; 712/221; 712/35
(58) Field of Classification Search ........ 711/170, 711/173, 165; 345/501, 536, 537
See application file for complete search history.

(56) References Cited

U.S. PATENT DOCUMENTS

| | | | |
|---|---|---|---|
| 5,589,885 | A | 12/1996 | Ooi |
| 6,134,631 | A | 10/2000 | Jennings, III |
| 6,426,754 | B1 * | 7/2002 | Kyo ............ 345/556 |
| 6,622,233 | B1 * | 9/2003 | Gilson ............ 712/11 |
| 6,738,891 | B2 * | 5/2004 | Fujii et al. ............ 712/16 |
| 2003/0007636 | A1 * | 1/2003 | Alves et al. ............ 380/37 |
| 2003/0046513 | A1 * | 3/2003 | Furuta et al. ............ 712/15 |
| 2003/0220562 | A1 * | 11/2003 | Sasaki et al. ............ 600/425 |
| 2004/0054870 | A1 * | 3/2004 | Kirsch ............ 712/11 |

FOREIGN PATENT DOCUMENTS

KR 200251545 6/2002

\* cited by examiner

*Primary Examiner*—B. James Peikari
(74) *Attorney, Agent, or Firm*—Stanzione & Kim, LLP

(57) ABSTRACT

A DSP (Digital Signal Processing) architecture with a wide memory bandwidth and a memory mapping method thereof. The DSP architecture includes: a first communication port; first, second, and third memory devices, which are connected with the first communication port and are arranged in a first row direction of the DSP architecture; a fourth memory device, a calculation element, and a fifth memory device, which are arranged in a second row direction below a first row direction of the DSP architecture; and sixth, seventh, and eighth memory devices, which are connected with the first communication port and arranged in a third row direction of the DSP architecture, wherein the calculation element is connected with the first through the eight memory devices. In the DSP architecture, the calculation element and the first through the eighth memory devices form one arrangement unit, wherein the calculation element is disposed in the center of the arrangement unit, the first through the eighth memory devices are connected to the calculation element, and a plurality of arrangement units are arranged in row directions and column directions of the DSP architecture. Therefore, since a wide data bandwidth is provided between the calculation element of the DSP architecture and the memory devices, it is possible to reduce memory access times when data is processed, and accordingly, to process data with a high data rate, such as a moving image with a high resolution.

14 Claims, 8 Drawing Sheets

DIGITAL SIGNAL PROCESSING ARCHITECTURE WITH A WIDE MEMORY BANDWIDTH AND A MEMORY MAPPING METHOD THEREOF

CROSS-REFERENCE TO RELATED APPLICATIONS

This application claims the priority of Korean Patent Application No. 2003-58781, filed on Aug. 25, 2003, in the Korean Intellectual Property Office, the disclosure of which is incorporated herein in its entirety by reference.

BACKGROUND OF THE INVENTION

1. Field of the Invention

The present invention relates to a DSP (digital signal processing) architecture, and more particularly, to a DSP architecture that provides a wide memory bandwidth according to an image processing algorithm, and a memory mapping method thereof.

2. Description of the Related Art

One among basic functions that are performed by a digital processor is to access a memory for data reading and writing. The memory is generally accessed by an address provided from a digital processor. The memory access operation of the digital processor is greatly influenced by the input-output structure of the memory, and particularly, is closely related to a memory bandwidth which represents the number of data capable of being input/output at one time.

A Digital Signal Processing (hereinafter, referred to as "DSP") architecture performs image processing such as image enhancement, compression, and decompression. Particularly, in a DSP architecture which processes moving images as shown in FIG. 1, for example, when an algorithm which accesses three frames and creates a new frame is executed, three video image frames 101, 102, and 103, as sources, are stored in a memory 120 through the DSP CE architecture 110, and the three frame data stored in the memory 120 are read out and processed by a calculation element of the DSP architecture 110, thereby creating one frame 130.

Assuming that the DSP architecture 110 processes moving images with a resolution of 1920×1080 pixels at 60 Hz, the number of pixels to be processed per second is 1920×1080× 60≈124M. Here, considering R, G, and B color components, the number of pixels to be processed per second is 124M× 3=373M. To store the 373M pixels in the memory 120, the access operations between the DSP architecture 110 and the memory 120, that is, writing operations and reading operations should be repeated several times.

Meanwhile, to operate a DSP architecture at a high speed, a Harvard architecture that includes a data path and an instruction path separately is generally used as a DSP architecture. FIGS. 2 through 4 show examples of Harvard architectures used as DSP architectures.

FIG. 2 shows a conventional representative Harvard architecture wherein image data is loaded into data buses, stored in an external SDRAM under the control of an SDRAM controller, and then read out.

However, image data processed by the DSP architecture 200 of FIG. 2 is dependent on the data bandwidth of the memory devices, as seen in FIG. 2. For example, if an algorithm that accesses three frames and creates a new frame is executed according to a three-dimensional de-interlacing method, memory access operations for 8 pixels per one motion check are required, and accordingly, memory access operations for 64 pixels are required since the 8 memory access operations should be performed 8 times in a three-dimension de-interlacing method. Such a memory access operation requires a predetermined cycle time consumed for operations to address memory cells and operations to read cell data. Particularly, in a case of the resolution of 1920× 1080 pixels, 24 memory access cycles are necessary if a DSP architecture with an operation speed of 3.0 GHz is used to process 124M pixels. Therefore, it is difficult to process high resolution images due to the existence of such a physical access cycle required to access the memory in the DSP architecture.

Accordingly, to process high resolution images, a new DSP architecture with a wide memory bandwidth is necessary.

SUMMARY OF THE INVENTION

It is an aspect of the present invention to provide a DSP (Digital Signal Processing) architecture with a wide memory bandwidth.

It is another aspect of the present invention to provide a memory mapping method to process an image using the DSP architecture.

Additional aspects and advantages of the present invention will be set forth in part in the description which follows and, in part, will be obvious from the description, or may be learned by practice of the invention.

The foregoing and/or other aspects of the present invention are achieved by providing a DSP (Digital Signal Processing) architecture with a wide memory bandwidth, the DSP architecture comprising: a first communication port; first, second, and third memory devices, which are connected with the first communication port and are arranged in a first row direction of the DSP architecture; a fourth memory device, a calculation element, and a fifth memory device, which are arranged in a second row direction below the first row direction of the DSP architecture; and sixth, seventh, and eighth memory devices, which are connected with the first communication port and arranged in a third row direction of the DSP architecture, wherein the calculation element is connected with the first through the eight memory devices.

It is an aspect of the present invention that the DSP architecture further comprises a second communication port, which is connected with the first, the fourth, and the sixth memory devices arranged in a first column direction of the DSP architecture, and with the third, the fifth, and the eighth memory devices arranged in a third column direction of the DSP architecture.

It is another aspect of the present invention that the calculation element and the first through the eighth memory devices form one arrangement unit, wherein the calculation element is disposed in the center of the arrangement unit, the first through the eighth memory devices are connected to the calculation element, and the arrangement unit is arranged in row directions and column directions of the DSP architecture.

The foregoing and/or other aspects of the present invention are also achieved by providing a memory mapping method of processing an image, which is used in a DSP architecture, the method comprising: storing data received through a first communication port in first and second memory devices arranged in a first row direction of the DSP architecture; storing the data received through the first communication port in a third memory device arranged in a second row direction of the DSP architecture, wherein the data is stored in the third memory device, through a first calculation element that is connected with the first and the second memory devices and neighboring with the third memory device in the second row direction; and processing the data stored in the first through the third memory devices using the first calculation element.

It is an aspect of the present invention that the memory mapping method further comprises: storing the data processed by the first calculation element in a fourth memory device neighboring with the second memory device in the first row direction of the DSP architecture, and in a fifth memory device neighboring with the first calculation element in the second row direction of the DSP architecture; and processing the data stored in the fourth and the fifth memory devices using a second calculation element neighboring with the fifth memory device in the second row direction of the DSP architecture.

The foregoing and/or other aspects of the present invention are also achieved by providing a memory mapping method of processing an image, which is used in a DSP architecture, the memory comprising: storing data received through a first communication port in first and second memory devices arranged in a first row direction of the DSP architecture; storing the data received through the first communication port in fourth and fifth memory devices arranged in a third row direction of the DSP architecture; storing the data received through the first communication port in a third memory device arranged in a second row direction of the DSP architecture, wherein the data is stored in the third memory device, through a first calculation element connected with the first and the second memory devices and neighboring with a third memory device in the second row direction; storing the data received through the first communication port in a sixth memory device arranged in a fourth row direction of the DSP architecture, wherein the data is stored in the sixth memory device, through a second calculation element connected with the fourth and the fifth memory devices and neighboring with the sixth memory device; processing the data stored in the first through the third memory devices using the first calculation element; and processing the data stored in the fourth through the sixth memory devices using the second calculation element.

It is an aspect of the present invention that the memory mapping method further comprises: storing the data calculated by the first calculation element in a seventh memory device neighboring with the second memory deice in the first row direction of the DSP architecture, and in an eighth memory device neighboring with the first calculation element in the second row direction of the DSP architecture; processing the data stored in the seventh and the eighth memory devices using a third calculation element neighboring with the eighth memory device in the second row direction of the DSP architecture; storing the data calculated by the second calculation element in a ninth memory device neighboring with the fifth memory device in the third row direction of the DSP architecture, and in a tenth memory device neighboring with the second calculation element in the fourth row direction of the DSP architecture; and processing the data stored in the ninth and the tenth memory devices using a fourth calculation element neighboring with the tenth memory device in the fourth row direction of the DSP architecture.

The foregoing and/or other aspects of the present invention are also achieved by providing a memory mapping method of processing an image, which is used in a DSP architecture, the method comprising: storing data received through a first communication port in first, second, and third memory devices arranged in a first row direction of the DSP architecture, or in sixth, seventh, and eighth memory devices arranged in a third row direction of the DSP architecture; storing data received through a second communication port in the first and the sixth memory devices and a fourth memory device that are arranged in a first column direction of the DSP architecture, or in the third and the eighth memory devices and a fifth memory device that are arranged in a third column direction of the DSP architecture; and processing the data stored in the first through the eighth memory devices, using a calculation element disposed between the fourth and the fifth memory devices arranged in a second row direction of the DSP architecture and between the second and the seventh memory devices arranged in a second column direction of the DSP architecture.

Therefore, according to the embodiments of the present invention, since a wide memory bandwidth is provided between a calculation element of the DSP architecture and a memory device, it is possible to reduce memory access times when data is processed and accordingly process data with a high date rate, such as a moving image with a high resolution.

BRIEF DESCRIPTION OF THE DRAWINGS

These and other objects and advantages of the present invention will become apparent and more readily appreciated from the following description of the embodiments, taken in conjunction with the accompanying drawings of which.

DETAILED DESCRIPTION OF THE PREFERRED EMBODIMENTS

Figure 1:
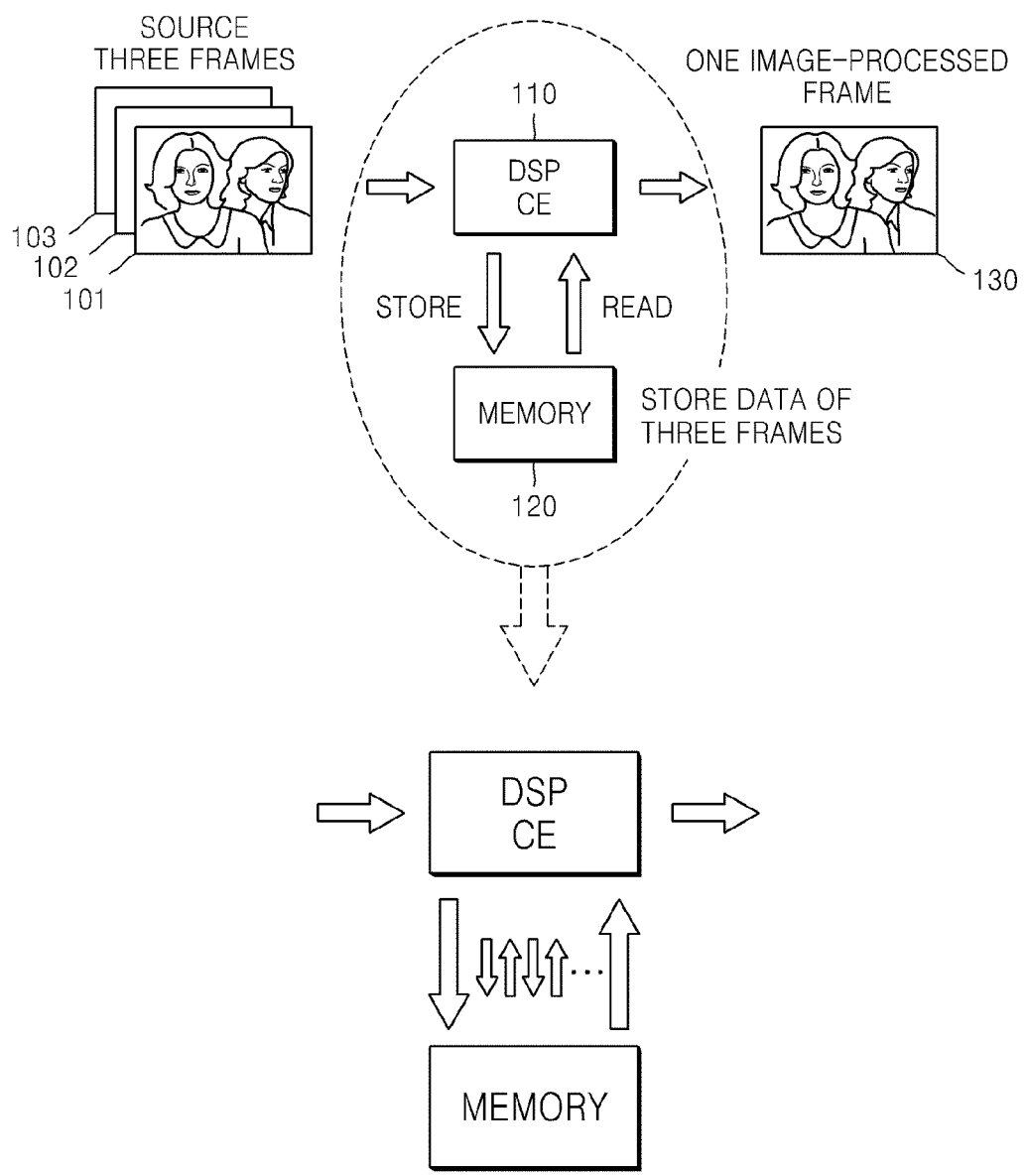
FIG. 1 illustrates an operation of a DSP (Digital Signal Processing) architecture to process moving images.
Figure 2:
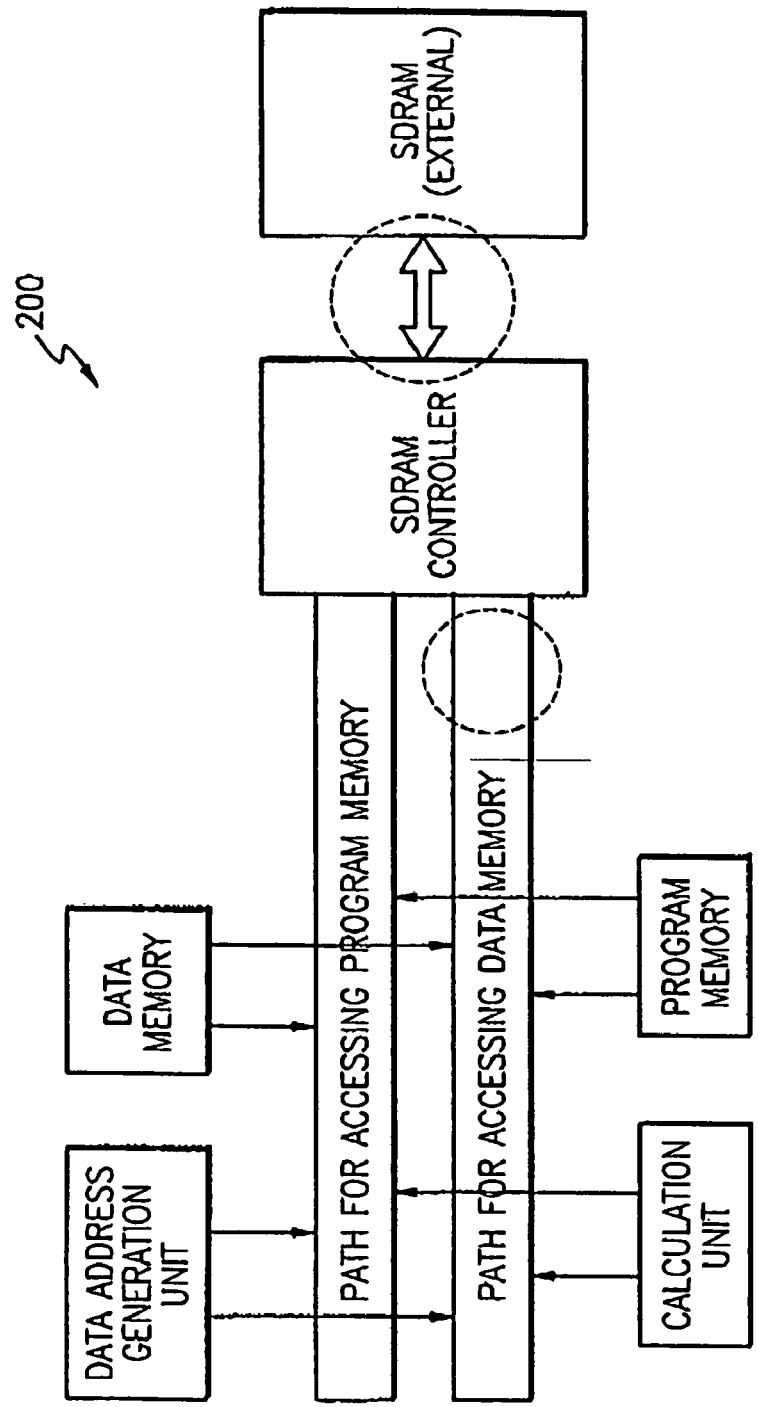
FIG. 2 is a block diagram of a conventional Harvard architecture as a DSP architecture.

Reference will now be made in detail to the embodiments of the present invention, examples of which are illustrated in the accompanying drawings, wherein like reference numerals refer to the like elements throughout. The embodiments are described below in order to explain the present invention by referring to the figures.

Figure 3:
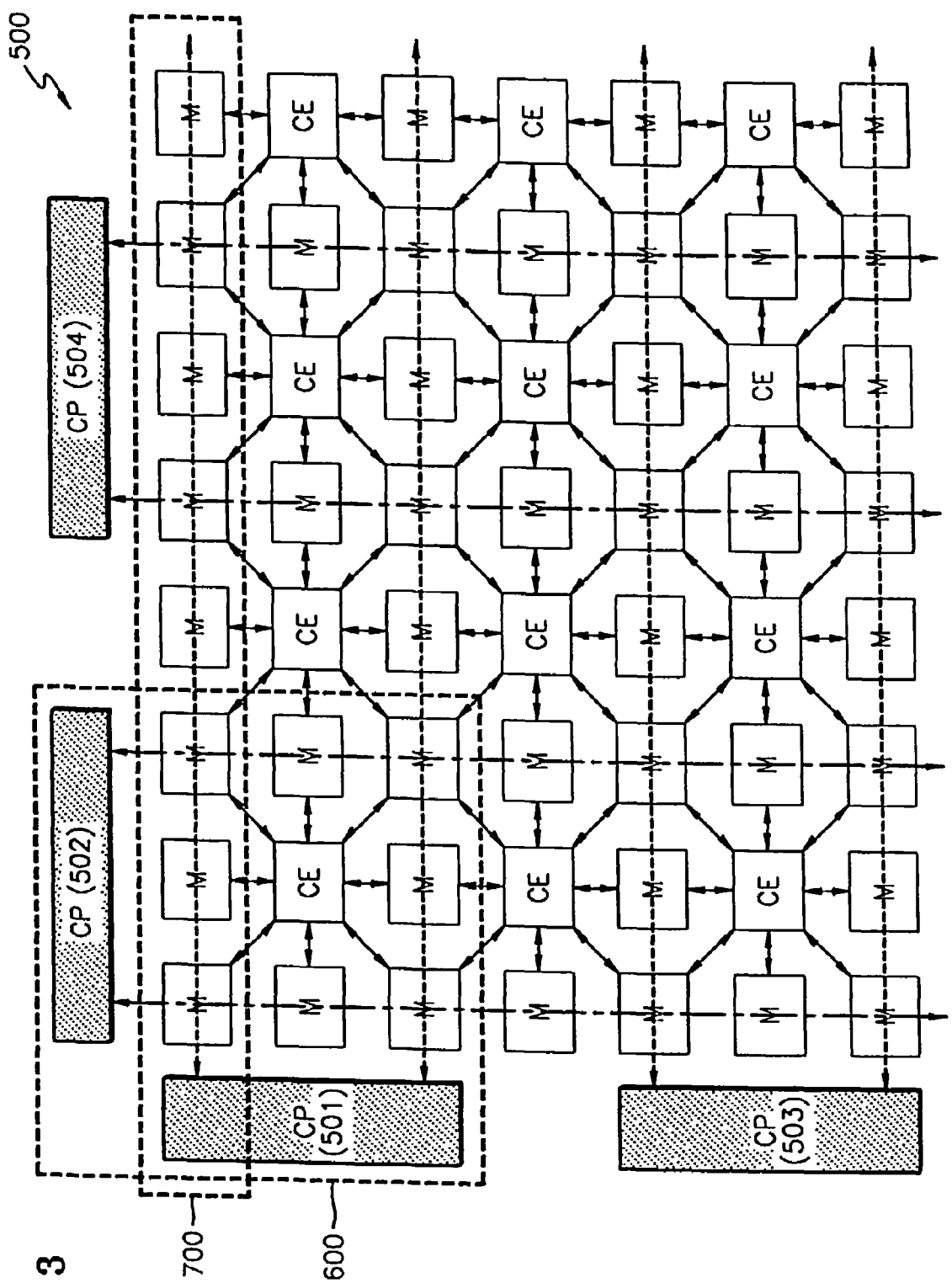
FIG. 3 illustrates a DSP architecture with a parallel structure, according to an embodiment of the present invention.

FIG. 3 illustrates a DSP (Digital Signal Processing) architecture 500 with a parallel structure, according to an embodiment of the present invention. Referring to FIG. 3, the DSP architecture 500 includes first and third communication ports (CPs) 501 and 503 arranged in a column direction and second and fourth communication ports (CPs) 502 and 504 arranged in a row direction. The first through fourth communication ports 501, 502, 503, and 504 are input/output ports to receive and/or transmit data from/to the DSP architecture 500. The first and the second communication ports 501 and 502 and the third and the fourth communication ports 503 and 504 are connected with a plurality of memories (Ms) which are arranged with a matrix structure and each connected with a calculation element (CE).

The first communication port 501 is connected with memories (Ms) of a first row and memories (Ms) of a third row. The third communication port 503 is connected with memories (Ms) of a fifth row and memories (Ms) of a seventh row. The second communication port 502 is connected with memories (Ms) of a first column and memories (Ms) of a third column.

The fourth communication port 504 is connected with memories (Ms) of a fifth column and memories (Ms) of a seventh column. The calculation elements (CEs) are each connected with 8 adjacent memories (Ms). The 8 memories (Ms) connected with one calculation element (CE) forms one arrangement unit 600, which is illustrated in FIG. 4.

Figure 4:
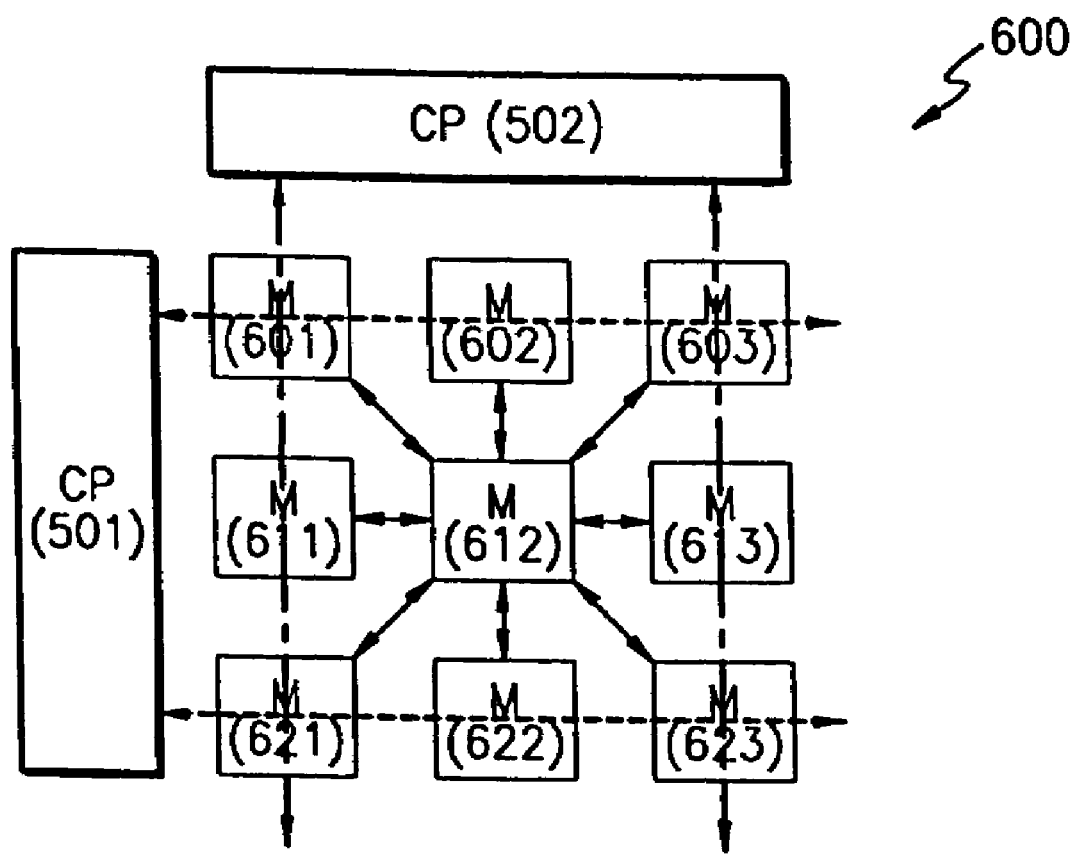
FIG. 4 illustrates one arrangement unit in the DSP architecture of FIG. 3.

Referring to FIG. 4, memories 601, 602, and 603 of the first row and memories 621, 622, and 623 of the third row which are connected with the first communication port 501, and memories 601, 611, and 621 of the first column and the memories 603, 613, and 623 of the third column which are connected with the second communication port 502, are connected to a calculation element 612. In the arrangement unit 600, data input to the first communication port 501 is stored in the memories 601, 602, 603, 621, 622, and 623 of the first or the third row, and data input to the second communication port 502 is stored in the memories 601, 611, 621, 603, 613, and 623 of the first or the third column. Thereafter, the stored data are read out and operation-processed by the calculation element 612.

Figure 5:
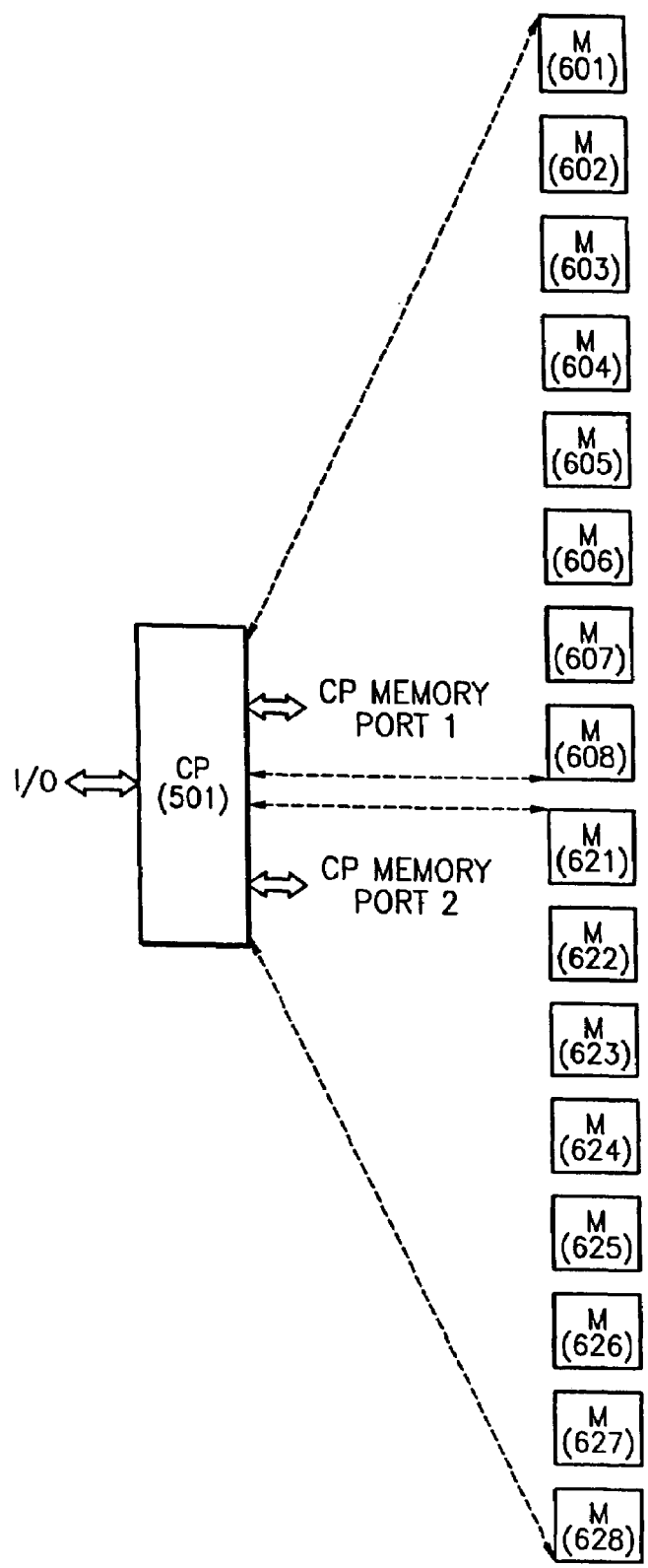
FIG. 5 illustrates memory devices connected with one communication port of FIG. 3.

For example, a predetermined portion of the first communication port 501 of FIG. 3 as a representative communication port is connected with the memories 601, 602, 603, 604, 605, 606, 607, and 608 of the first row through a CP memory port 1, and the remaining portion of the first communication port 501 is connected with the memories 621, 622, 623, 624, 625, 626, 627, and 628 of the third row through a CP memory port 2, as illustrated in FIG. 5.

Figure 6:
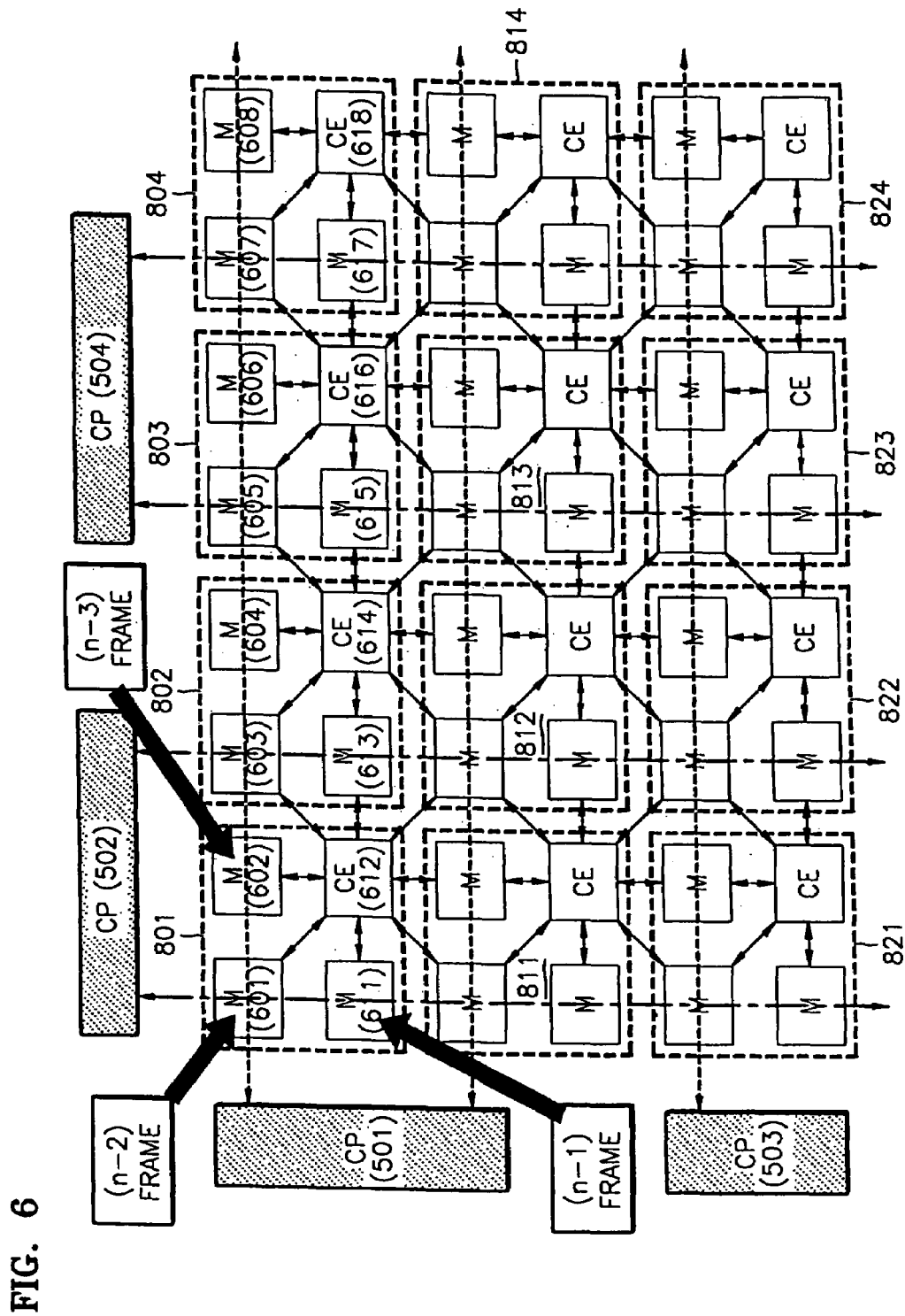
FIG. 6 illustrates a one-dimensional segmentation operation performed by the DSP architecture of FIG. 3.
Figure 7:
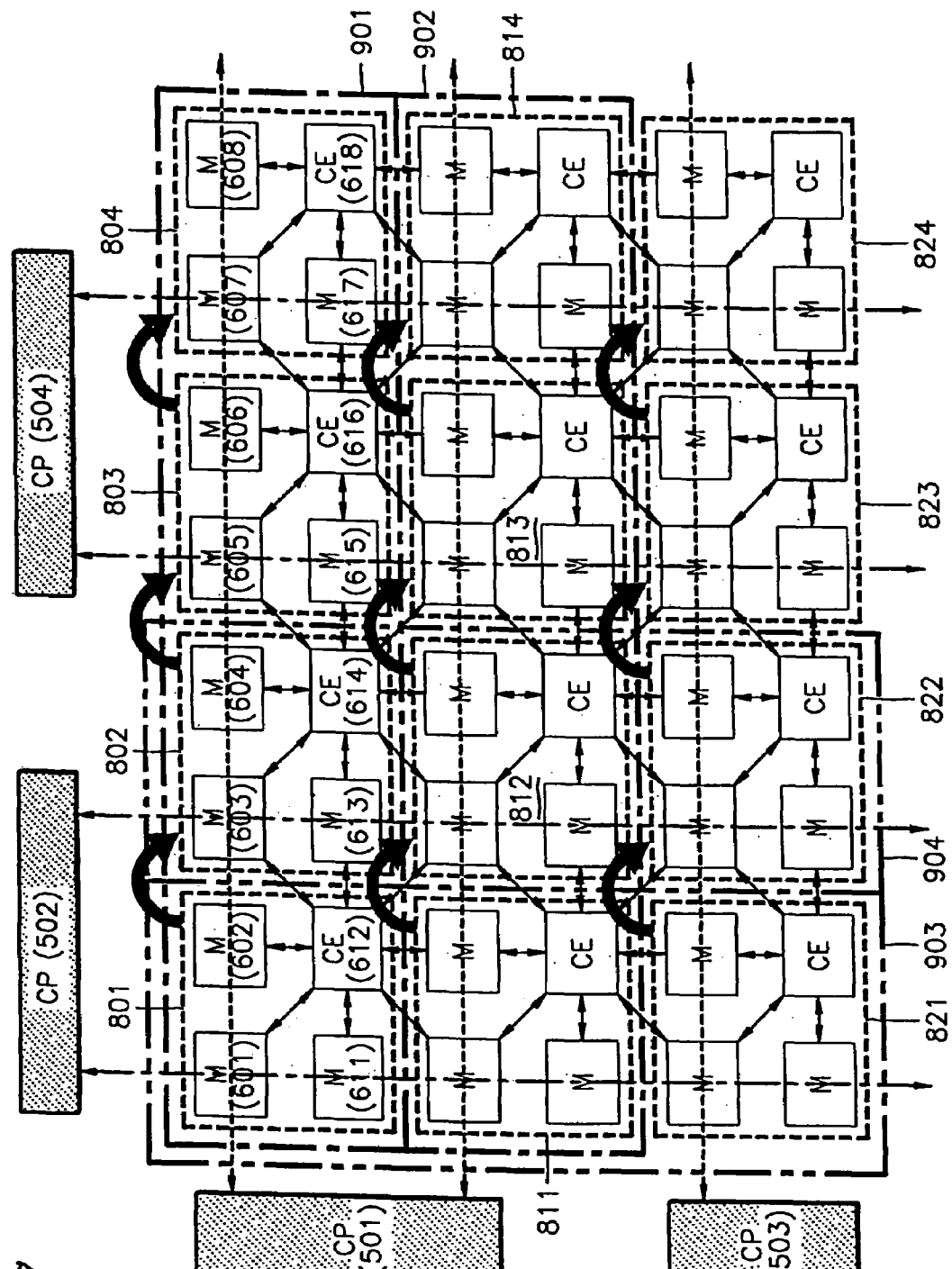
FIGS. 7 and 8 illustrate a two-dimensional segmentation operation performed by the DSP architecture of FIG. 3.
Figure 8:
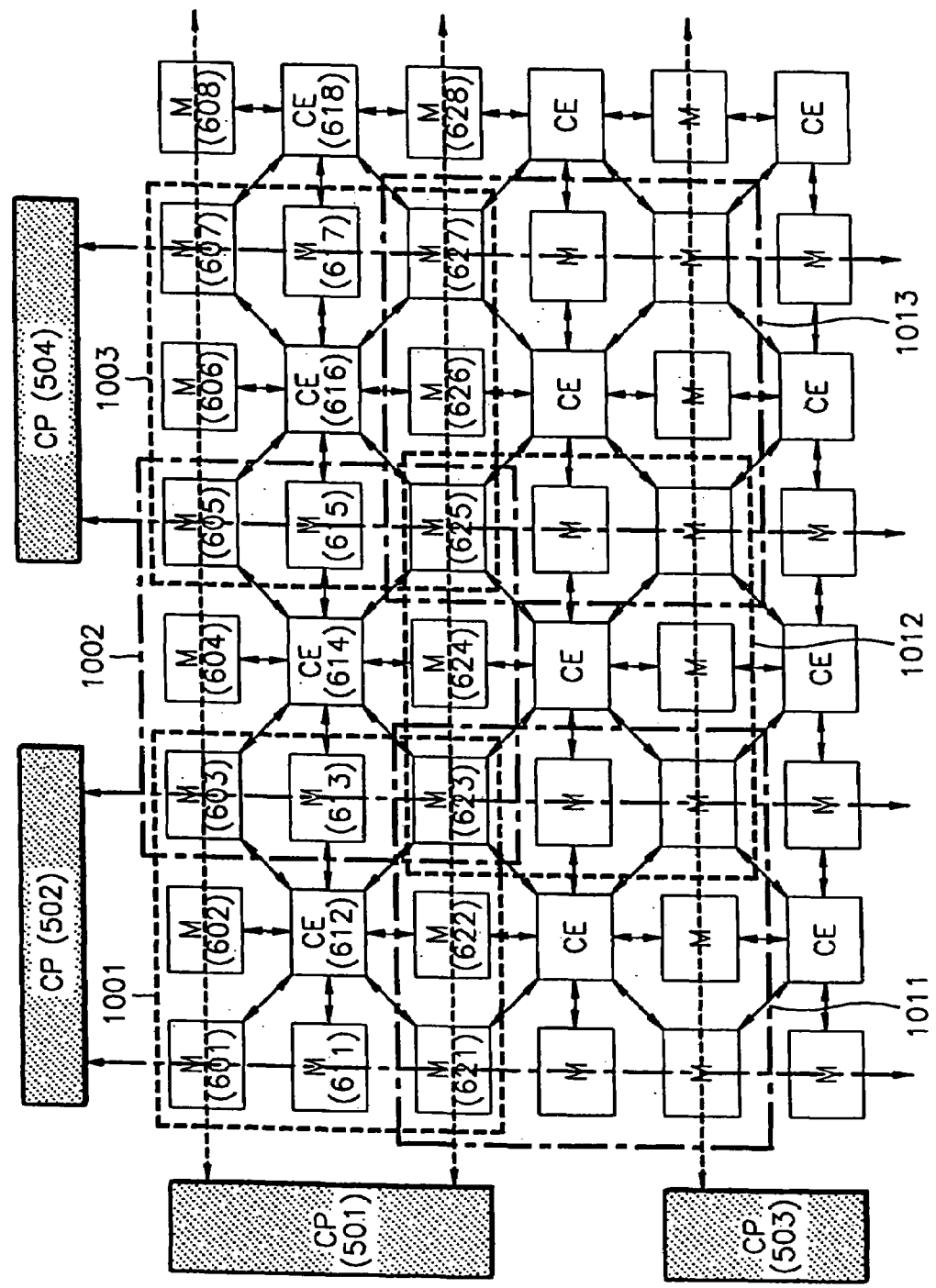

The DSP architecture 500 of FIG. 3 performs a one-dimensional (1-D) segmentation operation or a two-dimensional (2-D) segmentation operation in order to process moving images. FIG. 6 illustrates the one-dimensional segmentation operation, and FIGS. 7 and 8 illustrate the two-dimensional segmentation operation.

The one-dimensional segmentation operation is a technique that divides an image picture into predetermined sizes and processes the divided image pictures along one direction, for example, along a row or a column direction. The two-dimensional segmentation operation is a technique that divides an image picture with a predetermined size and processes the divided image pictures along two rows or columns. In the present invention, image data is input through one communication port when the one-dimensional segmentation operation is executed, and image data is input through one or two communication ports when the two-dimensional segmentation operation is executed.

The one-dimensional segmentation operation will be described in detail with reference to FIG. 6. When an algorithm that accesses three frames and creates a new frame is executed, frame data of three frames (n-1), (n-2), and (n-3) are stored in the memories 611, 601, and 602, respectively. The frame data of the frames (n-1), (n-2), and (n-3) are input to the memories 611, 601, and 602, for example, through the first communication port 501. Since the memories 601 and 602 are directly connected with the first communication port 501, the (n-2) frame data and the (n-3) frame data are directly stored from the first communication port 501 to the memories 601 and 602. The (n-1) frame data is transferred to the calculation element 612 through the memory 601 or 602 and then is stored in the memory 611 by the calculation element 612. The memories 601, 602, and 611 and the calculation element 612 form one unit to perform the one-dimensional segmentation operation.

Meanwhile, if the (n-1), (n-2), and (n-3) frame data are input through the second communication port 502, the (n-1) and the (n-2) frame data are directly stored from the second communication port 502 in the memories 601 and 611. Since the memory 602 is not connected directly to the second communication port 502, the (n-3) frame is transferred to the calculation element 612 through the second communication port 502 and the memory 601 or 611 and then is stored in the memory 602 by the calculation element 612.

The frame data stored in the memories 601, 602, and 611 are operation-processed by the calculation element 612 and transferred to an adjacent second segmentation unit 802. The data processed by the calculation element 612 of the first segmentation unit 801 is transferred to the memories 603 and 613 of the second segmentation unit 802 and stored therein. The data stored in the memories 603 and 613 is operation-processed by the calculation element 614, then transferred to the memory 605 or 615 of a third segmentation unit 803, and stored in the memory 605 or 615.

In the present embodiment, the one-dimensional segmentation operation is performed by a pipeline operation on one line consisting of the first segmentation unit 801 including the memories 601 and 602, the second segmentation unit 802, the third segmentation unit 803, and a fourth segmentation unit 804, which are connected with the first communication port 501. Also, the one-dimensional segmentation operation can be performed by a pipeline operation on one line consisting of the fourth segmentation unit 811, a fifth segmentation unit 812, a sixth segmentation unit 813, and a seventh segmentation unit 814, which are connected with the first communication port 501.

Also, according to another example for the one-dimensional segmentation operation, the one-dimensional segmentation operation is performed by a pipe-line operation of the data input to the second communication port 502 on one line consisting of the first segmentation unit 801, the fourth segmentation unit 811, and an eighth segmentation unit 821, or on one line consisting of the second segmentation unit 802, the sixth segmentation unit 812, and a tenth segmentation unit 822.

Here, the calculation element 612 in one segmentation unit 801 has independent paths to access three memories 601, 602, and 611. Thus, the calculation element 612 has a wider bandwidth allowing access, thereby reducing memory access times when processing moving pictures.

FIGS. 7 and 8 illustrate the two-dimensional segmentation operation. FIG. 7 illustrates an example of a two-line pipeline operation. FIG. 8 illustrates an example of a one-line pipeline operation.

Referring to FIG. 7, for example, frame data received through the first communication port 501 are operation-processed through a first line 901 with a pipeline structure including the first segmentation unit 801, the second segmentation unit 802, the third segmentation unit 803, and the fourth segmentation unit 804, and through a second line 902 with a pipeline structure including the fifth segmentation unit 811, the sixth segmentation unit 812, the seventh segmentation unit 813, and the eighth segmentation unit 814, thereby being subjected to the two-dimensional segmentation operation.

For example, frame data received through the second communication port 502 are operation-processed through a third line 903 with a pipeline structure including the first segmentation unit 801, the fifth segmentation unit 811, and the ninth segmentation unit 821, and through a fourth line 904 with a pipeline structure including the second segmentation unit 802, the sixth segmentation unit 812, and the tenth segmentation unit 822, thereby being subjected to the two-dimensional segmentation operation.

Referring to FIG. 8, to perform the two-dimensional segmentation operation, the frame data received through the communication ports 501, 502, 503, and 504 are memory-mapped to segmentation units 1001, 1002, 1003, 1011, 1012, and 1013.

Representatively, in the first segmentation unit 1001, the data received through a predetermined portion of the first communication port 501 are stored in the memories 601, 602, and 603 and the data received through the remaining portion of the first communication port 501 are stored in the memories 621, 622, and 623. The data received through the first communication port 501 are also stored in the memories 611 and 613 through the calculation element 612 connected with the memories 601, 602, 603, 621, 622, and 623. Then, the data stored in the memories 601, 602, 603, 611, 613, 621, 622, and 623 are operation-processed by the calculation element 612, thereby being subjected to the two-dimensional segmentation operation.

According to another memory mapping method of performing the two-dimensional segmentation operation, data received through predetermined ports of the second communication port 502 in the first segmentation unit 1001 are stored in the memories 601, 611, and 621, and data received through the remaining ports of the second communication port 502 are stored in the memories 603, 613, and 623. The data received through the second communication port 502 are also stored in the memories 602 and 622 through the calculation element 612 connected with the memories 601, 611, 621, 603, 613, and 623. Thereafter, the data stored in the memories 601, 602, 603, 611, 613, 621, 622, and 623 are operation-processed by the calculation element 612, thereby being subjected to the two-dimensional segmentation operation.

According to another memory mapping method of the two-dimensional segmentation operation, the data received through the first communication port 501 in the first segmentation unit 1001 are stored in the memories 601, 602, and 603 or in the memories 621, 622, and 623, and the data received through the second communication port 502 are stored in the memories 601, 611, and 621 or in the memories 603, 613, and 623. The memories 601, 603, 621, and 623 store the data received through one communication port, the first communication port 501 or the second communication port 502, in order to avoid data collision. Then, the data stored in the memories 601, 602, 603, 611, 613, 621, 622, and 623 are operation-processed by the calculation element 612, thereby being subjected to the two-dimensional segmentation operation.

Although a few embodiments of the present invention have been shown and described, it will be appreciated by those skilled in the art that changes may be made in these embodiments without departing from the principles and spirit of the invention, the scope of which is defined in the appended claims and their equivalents.

What is claimed is:

1. A DSP (Digital Signal Processing) architecture with a wide memory bandwidth, the DSP architecture comprising:
    a first communication port;
    first, second, and third memory devices, which are connected with the first communication port and are arranged in a first row direction of the DSP architecture;
    a fourth memory device, a calculation element, and a fifth memory device, which are arranged in a second row direction below the first row direction of the DSP architecture; and
    sixth, seventh, and eighth memory devices, which are connected with the first communication port and arranged in a third row direction of the DSP architecture, wherein the calculation element is surrounded by the first through the eighth memory devices and is directly connected with each of the first through the eighth memory devices.

2. The DSP architecture of claim 1, further comprising a second communication port, which is connected with the first, the fourth, and the sixth memory devices arranged in a first column direction of the DSP architecture, and with the third, the fifth, and the eighth memory devices arranged in a third column direction of the DSP architecture.

3. The DSP architecture of claim 2, wherein the second and seventh memory devices are connected to the second communication port through the calculation element and arranged in a second column direction of the DSP architecture.

4. The DSP architecture of claim 3, wherein the second column direction is disposed between the first and the third column directions.

5. The DSP architecture of claim 4, wherein the second row direction is disposed between the first and the third row directions.

6. The DSP architecture of claim 1, wherein the calculation element and the first through the eighth memory devices form one arrangement unit, wherein the calculation element is disposed in the center of the arrangement unit, the first through the eighth memory devices are connected to the calculation element, and the arrangement unit is arranged in row directions and column directions of the DSP architecture.

7. A memory mapping method to process an image, which is used in a DSP architecture, the method comprising:
    storing data received through a first communication port in first, second, and third memory devices arranged in a first row direction of the DSP architecture, or in sixth, seventh, and eighth memory devices arranged in a third row direction of the DSP architecture;
    storing data received through a second communication port in the first and the sixth memory devices and a fourth memory device that are arranged in a first column direction of the DSP architecture, or in the third and the eighth memory devices and a fifth memory device that are arranged in a third column direction of the DSP architecture; and
    processing the data stored in the first through the eighth memory devices, using a calculation element disposed between the fourth and the fifth memory devices arranged in a second row direction of the DSP architecture and between the second and the seventh memory devices arranged in a second column direction of the DSP architecture.

8. The memory mapping method of claim 7, wherein the data comprises image data divided into at least three image frames such that the storing of the data comprises storing the at least three image frames in the first through the eighth memory devices; and
    the processing of the data stored in the first through the eighth memory devices comprises performing an image segmentation process in at least one dimension using the calculation element.

9. A DSP (Digital Signal Processing) architecture with a wide memory bandwidth, the DSP architecture comprising:
    a first communication port to receive data;
    at least three memory devices connected with the first communication port and arranged in a first row direction of the DSP architecture to temporarily store at least a first portion of the data received at the first communication port;

at least two memory devices arranged in a second row direction below the first row direction of the DSP architecture;

at least three memory devices connected with the first communication port and arranged in a third row direction of the DSP architecture to temporarily store at least a second portion of the data received at the first communication port; and a calculation element connected with each of the memory devices of the first, second and third rows of the DSP architecture to process and transfer the first portion of the data temporarily stored in the at least three memory devices in the first row and to process and transfer the second portion of the data temporarily stored in the at least three memory devices in the third row.

10. The DSP architecture of claim 9, further comprising a second communication port connected with at least two memory devices in each of the first, second and third rows of the DSP architecture.

11. A DSP (Digital Signal Processing) architecture, comprising:

a first communication port to receive first motion picture image data divided into image frames;

a second communication port to receive second motion picture image data divided into image frames; and a first arrangement unit connected to the first communication port and the second communication port, wherein the first arrangement unit comprises first through eighth memories to store respective ones of the image frames of the first and second motion picture image data and a calculation element to access the respective image frames of the first through eighth memories which are arranged in a matrix structure having three columns and three rows, the second and seventh memories are connected to the second communication port through the calculation element, and the fourth and fifth memories are connected to the first communication port through the calculation element.

12. The DSP architecture of claim 11, further comprising:

a third communication port; and a second arrangement unit connected to the third communication port and to the first and second communication ports through the sixth and the eighth memories of the arrangement unit, wherein the second arrangement comprises eight memories and a second calculation element which are arranged in a matrix structure having three columns and three rows.

13. The DSP architecture of claim 12, further comprising:

a third calculation element and two memories which are disposed between the first and second arrangement units, wherein the two memories are connected to the memories of the first and second arrangement units through the third calculation element.

14. The DSP architecture of claim 11, wherein the calculation element is coupled to the first through the eighth memories to obtain at least one of the first and second motion picture image data stored therein to subsequently perform image segmentation in at least one dimension thereon.

* * * * *